This invention relates to the regeneration of contact masses and more particularly to the regeneration of contact masses or catalyst beds used for the hydrotreating of hydrocarbon fractions.

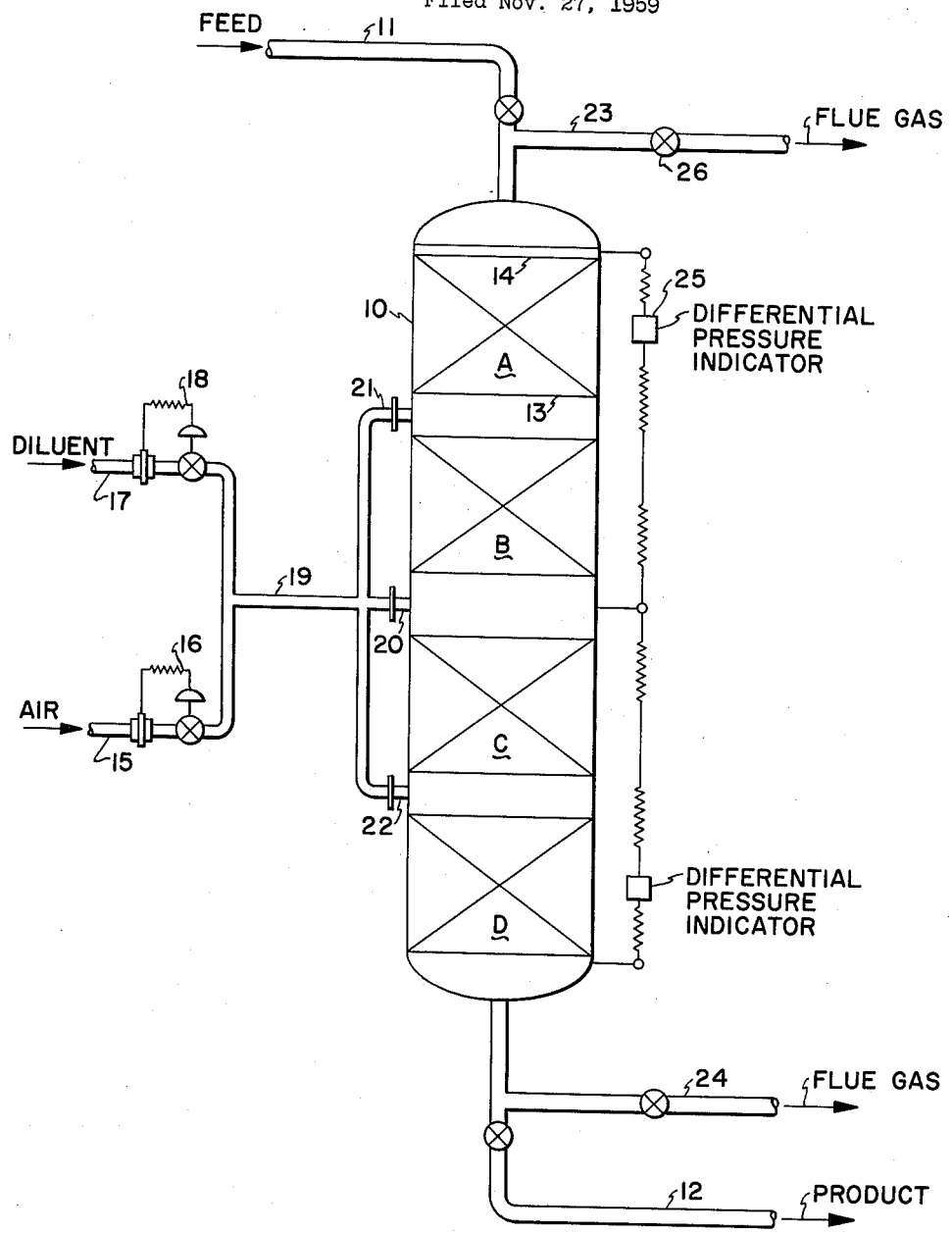
Walter Squires, Jr.
Antonio Terrenzio  Inventors 3,055,824
PROCESS FOR REGENERATION OF
CONTACT MASSES
Walter Squires, Jr., Westfield, and Antonio Terrenzio, Madison, N.J., assignors to Esso Research and Engineering Company, a corporation of Delaware
Filed Nov. 27, 1959, Ser. No. 855,860
12 Claims. (Cl. 208—216)

Numerous processes for the catalytic conversion of hydrocarbons are well known and widely used in the petroleum industry. Such processes as cracking, reforming, dehydrogenation, hydrofining and the like are all characterized by the fact that carbonaceous deposits are formed on the catalyst during the conversion process, gradually reducing the activity of the catalyst. Such loss in activity can, in part, be offset by gradually increasing the reactor bed temperature and/or by cutting down on the feed rate to the conversion zone. Ultimately, however, it becomes necessary to shut off feed to the unit and regenerate the catalyst by contacting the same with an oxygen-containing gas at elevated temperatures to burn off the inactivating carbonaceous deposits. Since these catalysts tend to become permanently deactivated on exposure to temperatures above about 1000° F. and may even undergo some permanent deactivation during regeneration at temperatures below 1000° F., it is ordinarily necessary to use air diluted with steam, nitrogen or flue gas in order to limit the temperature reached during regeneration.

It is the object of this invention to provide the art with an improved method for regenerating fixed beds of hydrocarbon conversion catalysts.

It is also the object of this invention to provide the art with a method for regenerating fixed beds of hydrocarbon conversion catalysts which shortens the total regeneration time as well as the time that the catalyst is exposed to high temperatures.

It is a further object of this invention to provide a method for regenerating fixed beds of hydrocarbon conversion catalysts which effectively removes foreign contaminants from the catalyst bed while minimizing adverse effects of said contaminants upon the physical and catalytic properties of the catalyst bed.

These and other objects will appear more clearly from the detailed specification and claims which follow.

It has now been found that fixed beds of hydrocarbon conversion catalysts can be most efficiently regenerated by introducing the regeneration gas (air and diluent gas) at an intermediate point of a catalyst bed or between the beds in a multi-bed reactor or multiple reactor set-up. This permits upflow regeneration of the top portion of the catalyst bed whereby iron scale or the like, which accumulates at the top or inlet portion of the bed, is partially removed overhead by entrainment in the regeneration gases. Moreover, the residual scale is kept from sintering during its oxidation and any sudden oxidation of this material is prevented from overheating the catalyst by the upward sweep of regeneration gases. Oxidation products from the scale which are deleterious to the catalyst are also removed overhead and thus contact of such oxidation products with the catalyst is minimized. The bottom portion of the bed is regenerated downflow in the usual manner.

A particular advantage of the regeneration process of this invention resides in the fact that it reduces the length of time the average catalyst particle is exposed to high regeneration temperatures and thus reduces considerably the amount of permanent catalyst deactivation that occurs during each regeneration. With this invention the catalyst in the top bed is not contacted by the hot gases formed during the downflow regeneration of the bottom bed and the catalyst in the bottom bed is not contacted by the hot gases formed during the upflow regeneration of the top bed. Accordingly the average catalyst particle is exposed to the hot gases from the burning zones for less time than in the prior art procedure of regenerating in only one direction.

In addition to the loss in activity on regeneration, these catalysts tend to lose crushing strength on exposure to the usual regeneration flame front temperatures. This is undesirable because it increases catalyst attrition and losses and causes an increase in pressure drop across the catalyst bed to the detriment of the onstream as well as the regeneration phases of the operation. By reducing the time of exposure of the average catalyst particle to regeneration temperatures the procedure of this invention also lowers or minimizes the loss in crushing strength of the catalyst.

Two regeneration schemes are possible in accordance with the present invention.

According to one scheme the top bed or beds are regenerated upflow and then the bottom bed or beds are regenerated downflow. The bed or beds not undergoing regeneration are maintained at a temperature below regeneration temperature by passing a small quantity of steam or inert gas (without added air) through said beds. This scheme minimizes the length of time the catalyst is heated during regeneration for those instances wherein it is impossible to regenerate upper bed or beds upflow and the lower bed or beds downflow simultaneously at the maximum rates set by pressure drop considerations because of insufficient steam or inert gas.

According to the second scheme, the top bed or beds are regenerated upflow and the bottom bed or beds downflow at the same time. This is the best scheme to use if sufficient steam or inert gas is available to permit regeneration at the fastest rates permitted by pressure drop considerations. This scheme gives the minimum total regeneration time and is preferred.

Referenec is made to the accompanying drawing illustrating diagrammatically one embodiment of the present invention.

In the drawing, 10 is an elongated vertical reactor vessel provided with an inlet line 11 for charging reactants to the vessel and an outlet line 12 for the discharge of reaction products. In a typical case such as in the hydrofining of hydrocarbon fractions the feed stock in liquid, vapor or mixed liquid-vapor form is charged in admixture with hydrogen or a hydrogen-rich gas at elevated temperatures and pressures. For example, a naphtha boiling range feed stock can be charged to the hydrofining reactor in order to remove sulfur or nitrogen compounds which may adversely effect the hydroforming of such naphtha fractions with platinum-alumina catalysts. Kerosene, heating oil, diesel fuel, lubricating oils as well as paraffin and microcrystalline waxes can be subjected to hydrofining to improve color, odor, burning characteristics, storage stability or the like.

Various catalysts have been proposed for hydrofining the above-mentioned feed stocks including molybdenum oxide, nickel-tungsten sulfide and, most frequently, cobalt molybdate or mixture of cobalt oxide and molybdenum oxide dispersed upon an alumina-containing support or base, preferably activated or adsorptive alumina. In general, such catalysts are prepared by first forming adsorptive alumina particles in any suitable or known way and then compositing molybdenum oxide and cobalt oxide therewith. The molybdenum oxide can, for example, be added as a slurry or it may be applied as a solution of ammonium molybdate. The cobalt oxide is conveniently added as a salt such as cobalt nitrate or acetate, salts which are readily decomposed to cobalt oxide and volatile materials. The cobalt oxide and molybdenum oxide may be provided in equimolar amounts or a molecular excess of one over the other may be used. Suitable catalysts contain from about 5 to about 25 wt. percent cobalt oxide and molybdenum oxide with the ratio of the former to the latter in the range of from about one to five to about five to one. It is generally preferred to activate the cobalt molybdate catalysts before use in the hydrofining process by pretreating with a sulfur compound such as hydrogen sulfide, carbon disulfide, or the like in an amount sufficient to convert about 25 to 50% of the catalytic metal oxides to the corresponding sulfides.

The hydrofining reaction conditions vary somewhat depending upon the nature of the feed stock, the character and the quantity of the impurity or contaminant to be removed and the degree of improvement desired. Typical reaction conditions for hydrofining naphthas are temperatures of about 400 to 750° F., pressure 50 to 400 p.s.i.g., feed rates of 1 to 20 v./v./hr., treat gas rates of about 30 to 3000 s.c.f. per barrel and hydrogen consumption of about 1 to 600 s.c.f. per barrel. In general higher temperatures and pressures and lower feed rates are preferred for the treatment of higher boiling feed stocks such as kerosene, diesel and gas oil. Typical conditions for hydrofining a diesel or gas oil would be 600–800° F., 50–1000 p.s.i.g., 0.25–10.0 v./v./hr. with about the same treat gas feed rates and consumption as indicated for naphatha hydrofining The catalyst, preferably in the form of uniform seized pills or extrudates, is arranged as a fixed bed within the reactor vessel 10. In the embodiment shown, four catalyst beds A, B, C and D are shown with suitable spacing between each bed for the introduction and distribution of regeneration gas as will be described below. Each catalyst bed is supported on a lower perforated plate or screen 13 and may also be provided with an upper screen to prevent the displacement of the catalyst either by the incoming reaction mixture or the incoming or upflowing regeneration gases. While four catalyst beds are shown, it will be understood that a greater number or as few as two beds can be used in a single reactor (or even a single bed with a suitable nozzle for the introduction of regeneration gas at the desired location in the reactor bed) or the catalyst can be arranged in one or more beds in each of two or more reactors with air or regeneration gas inlets arranged between the reactor vessels. The essential feature in any such arrangement is that the regeneration of the bed first contacted by the reaction mixture should be countercurrent to the direction of flow when the reactor is on stream.

In the arrangement shown, air for regeneration is supplied through inlet line 15 and flow controller 16 and diluent for the regeneration gas such as steam or inert gas, nitrogen or flue gas is supplied through inlet line 17 and flow controller 18. The ratio of diluent to air is so controlled that the regeneration gas mixture, at the start of the regeneration, will have an oxygen content of about 0.5 mol percent and will be at a temperature of about 700° F. The regeneration gas mixture is supplied via line 19 to regeneration nozzle 20 at the mid point of the reactor or to alternate regeneration nozzle 21 between upper beds A and B or alternate regeneration nozzle 22 between lower beds C and D. Instead of the arrangement shown, the diluent and air may be supplied to separate manifolds at the reactor so that diluent or diluent-air mixture may be readily supplied at any level in said reactor. Flue gas is discharged from the reactor vessel through upper discharge line 23 or lower discharge line 24. As indicated above, the oxygen content of the initial regeneration gas is limited and its temperature so controlled as to limit the flame front temperature and thus avoid deactivation of the catalyst. With hydrofining catalysts it is ordinarily preferred to maintain the maximum flame front temperature below about 850° F. during the flame front passage through the bed; and, in fact, particularly superior results can be obtained by maintaining the burning zone temperature at about 700–750° F. by charging the steam-air regeneration gas mixture at about 550°F. With other catalysts the temperature may be lower or higher. When carbon burning is essentially complete, the oxygen content of the regeneration gas can be increased until, if desired, whole air or even oxygen-enriched air is supplied to complete the cleanup of small traces of carbon and effect a thorough reactivation of the catalyst. The bed temperature is held no higher than 850° F. during this cleanup period to facilitate control of a second flame front to 1000° F.

Flow rates through the upper bed or beds are restricted to values below those which will lift the bed. For 50#/c.f. (bulk density) catalyst the maximum differential pressure would be 0.35 p.s.i./ft. For simultaneous regeneration of the upper and lower beds, the differential pressure observed on the differential pressure indicator 25 would be held below 0.35 p.s.i./ft. by adjustment of the flow control valve 26 in outlet line 23. The differential pressure across the bottom bed or beds is restricted to 1.0 p.s.i./ft. because of catalyst attrition above this figure. Since scale particles tend to accumulate at the inlet of the reactor, i.e., at the top of bed A it is essential to effect the regeneration of bed A with an upward flow of regeneration gas and at a sufficient velocity to entrain a substantial portion of the scale particles overhead from the reactor vessel. Of even greater importance, the upward flow of regeneration gas through the scale particles which accumulate at the top of the bed serves to convey the heat generated by the oxidation of the scale as well as scale oxidation products away from the main body of catalyst thereby avoiding deactivation of the main body of catalyst.

The foregoing description has given details for carrying out the present invention in a hydrofining reaction system. It will be understood that this invention is equally applicable to other hydrocarbon conversion reactor systems. For example, by charging the reactor with catalysts consisting of about 0.05 to 5.0% of a platinum group metal, preferably about 0.3 to 0.6 wt. percent platinum per se, upon a relatively pure adsorptive alumina support and containing amounts of chlorine substantially equal to the platinum group metal, the reactor can be utilized to hydroform naphthas to produce high octane number motor fuels. The naphtha feed having a boiling range of from about 150 to 350° F. is charged in admixture with about 2000–10,000 s.c.f./b. of hydrogen or hydrogen-rich recycle gas at temperatures of about 850–1000° F. and pressures of about 50–450 p.s.i.g. In the regeneration of such platinum-alumina catalysts it is preferred to use nitrogen or scrubbed flue gas as the diluent because steam tends to strip halogen or chlorine from the catalyst and adversely affects its activity.

The foregoing description contains a limited number of embodiments of the present invention. It will be understood, however, that numerous variations are possible without departing from the scope of this invention.

What is claimed is:

1. The method of converting hydrocarbons which comprises charging the hydrocarbons to a multi-bed fixed bed reactor, maintaining the hydrocarbons in contact with the bed until the desired conversion is effected, continuing the conversion until the activity of the catalyst is substantially reduced by the accumulation of carbonaceous deposits thereon, discontinuing the supply of hydrocarbons to said reaction zone, introducing an oxygen-containing regeneration gas to an intermediate portion of said catalyst bed whereby regeneration of the inlet portion of the catalyst bed is effected counter-currently to the direction in which hydrocarbon feed is charged thereto whereby a portion of the scale that accumulates at the inlet portion of the bed as well as heat and products formed in the oxidation of such scale is rapidly conveyed away from the catalyst bed.

2. The method of converting hydrocarbons which comprises charging the hydrocarbons to a multi-bed fixed bed reactor, maintaining the hydrocarbons in contact with the bed until the desired conversion is effected, continuing the conversion until the activity of the catalyst is substantially reduced by the accumulation of carbonaceous deposits thereon, discontinuing the supply of hydrocarbons to said reaction zone, introducing an oxygen-containing regeneration gas to an intermediate portion of said catalyst bed, passing a portion of the regeneration gas upflow through the upper portion of the catalyst bed carrying a portion of the scale that accumulates at the top of the bed as well as heat and products formed in the oxidation of such scale rapidly overhead and away from the main body of the catalyst and passing the remaining portion of the regeneration gas downwardly through the lower portion of the catalyst bed whereby the time that the average catalyst particle is subjected to the deteriorating action of the hot gases from the burning zone is materially reduced.

3. The process as defined in claim 2 wherein a diluent gas free of uncombined oxygen is supplied to a catalyst bed during the period that oxygen-containing regeneration gas is not being passed therethrough in order to maintain said bed below regeneration temperature.

4. The method of converting hydrocarbons which comprises charging the hydrocarbons to a multi-bed fixed bed reactor, maintaining the hydrocarbons in contact with the bed until the desired conversion is effected, continuing the conversion until the activity of the catalyst is substantially reduced by the accumulation of carbonaceous deposits thereon, discontinuing the supply of hydrocarbons to said reaction zone, introducing an oxygen-containing regeneration gas to an intermediate portion of said catalyst bed, passing oxygen-containing regeneration gas upflow through the upper portion of the catalyst bed carrying a portion of the scale that accumulates at the top of the bed as well as heat and products formed in the oxidation of such scale rapidly overhead and way from the main body of the catalyst and simultaneously passing oxygen-containing regeneration gas downwardly through the lower portion of the catalyst bed whereby the time that the average catalyst particle is subjected to the deteriorating action of the hot gases from the burning zone is materially reduced.

5. The process as defined in claim 2 wherein the flow rate of the regeneration gas through the upper portion of the bed is restricted to values below those which will lift the bed.

6. The method of hydrofining hydrocarbon fractions which comprises charging the hydrocarbons and hydrogen to a multi-bed reactor charged with a fixed bed of hydrofining catalyst maintained under active hydrofining conditions, maintaining the charge stock in contact with the catalyst until the desired conversion is effected, continuing the hydrofining reaction until the activity of the catalyst is substantially reduced by the accumulation of carbonaceous deposits thereon, discontinuing the supply of hydrocarbons to said reaction zone, introducing an oxygen-containing regeneration gas to an intermediate portion of said catalyst bed whereby regeneration of the inlet portion of the catalyst bed is effected countercurrently to the direction in which hydrocarbon feed is charged thereto whereby a portion of the scale that accumulates at the inlet portion of the bed as well as heat and products formed in the oxidation of such scale is rapidly conveyed away from the catalyst bed.

7. The method of hydrofining hydrocarbon fractions which comprises charging the hydrocarbons and hydrogen to a multi-bed reactor charged with a fixed bed of hydrofining catalyst maintained under active hydrofining conditions, maintaining the charge stock in contact with the catalyst until the desired conversion is effected, continuing the hydrofining reaction until the activity of the catalyst is substantially reduced by the accumulation of carbonaceous deposits thereon, discontinuing the supply of hydrocarbons to said reaction zone, introducing an oxygen-containing regeneration gas to an intermediate portion of said catalyst bed, passing a portion of the regeneration gas upflow through the upper portion of the catalyst bed carrying a portion of the scale that accumulates at the top of the bed as well as heat and products formed in the oxidation of such scale rapidly overhead and away from the main body of the catalyst and passing the remaining portion of the regeneration gas downwardly through the lower portion of the catalyst bed whereby the time that the average catalyst particle is subjected to the deteriorating action of the hot gases from the burning zone is materially reduced.

8. The process as defined in claim 7 wherein a diluent gas free of uncombined oxygen is supplied to a catalyst bed during the period that oxygen-containing regeneration gas is not being passed therethrough in order to maintain said bed below regeneration temperature.

9. The method of hydrofining hydrocarbon fractions which comprises charging the hydrocarbons and hydrogen to a multi-bed reactor charged with a fixed bed of hydrofining catalyst maintained under active hydrofining conditions, maintaining the charge stock in contact with the catalyst until the desired conversion is effected, continuing the hydrofining reaction until the activity of the catalyst is substantially reduced by the accumulation of carbonaceous deposits thereon, discontinuing the supply of hydrocarbons to said reaction zone, introducing an oxygen-containing regeneration gas to an intermediate portion of said catalyst bed, passing oxygen-containing regeneration gas upflow through the upper portion of the catalyst bed carrying a portion of the scale that accumulates at the top of the bed as well as heat and products formed in the oxidation of such scale rapidly overhead and away from the main body of the catalyst and simultaneously passing oxygen-containing regeneration gas downwardly through the lower portion of the catalyst bed whereby the time that the average catalyst particle is subjected to the deteriorating action of the hot gases from the burning zone is materially reduced.

10. The process as defined in claim 6 wherein the catalyst is a cobalt oxide-molybdenum oxide on alumina composition and the maximum temperature of regeneration is below 850° F.

11. The process as defined in claim 7 wherein the catalyst is a cobalt oxide-molybdenum oxide on alumina composition and the maximum temperature of regeneration is below 850° F.

12. The process as defined in claim 9 wherein the catalyst is a cobalt oxide-molybdenum oxide on alumina composition and the maximum temperature of regeneration is below 850° F.

References Cited in the file of this patent

UNITED STATES PATENTS

| 2,606,862 | Keith | Aug. 12, 1952 |
| 2,722,501 | Kassel | Nov. 1, 1955 |